United States Patent
Knutsson

(10) Patent No.: US 9,692,803 B2
(45) Date of Patent: Jun. 27, 2017

(54) COMPUTER DEVICE, SYSTEM AND METHODS FOR CONTROLLING AN EXCHANGE OF OBJECTS BETWEEN DEVICES

(71) Applicant: KING.COM LIMITED, St. Julians (MT)

(72) Inventor: Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 184 days.

(21) Appl. No.: 14/251,081

(22) Filed: Apr. 11, 2014

(65) Prior Publication Data
US 2014/0310378 A1    Oct. 16, 2014

Related U.S. Application Data

(60) Provisional application No. 61/811,019, filed on Apr. 11, 2013.

(51) Int. Cl.
| | |
|---|---|
| *G06F 15/16* | (2006.01) |
| *H04L 29/08* | (2006.01) |
| *G07F 17/32* | (2006.01) |

(52) U.S. Cl.
CPC ......... *H04L 67/02* (2013.01); *G07F 17/3274* (2013.01); *G07F 17/3281* (2013.01)

(58) Field of Classification Search
CPC ... G07F 17/3274; G07F 17/3281; H04L 67/02
See application file for complete search history.

(56) References Cited

U.S. PATENT DOCUMENTS

| | | | |
|---|---|---|---|
| 5,704,837 | A | 1/1998 | Iwasaki et al. |
| 6,093,104 | A | 7/2000 | Kasahara et al. |
| 8,021,220 | B2 | 9/2011 | Sakamoto et al. |
| 8,075,391 | B2 | 12/2011 | Rommerdahl et al. |

(Continued)

FOREIGN PATENT DOCUMENTS

| | | |
|---|---|---|
| WO | WO 2010/096784 A1 | 8/2010 |
| WO | 2011/011466 A1 | 1/2011 |
| WO | 2011/139716 A1 | 11/2011 |

OTHER PUBLICATIONS

International Search Report, dated Jul. 8, 2014, and Written Opinion issued in corresponding International Application No. PCT/EP2014/057449.

(Continued)

*Primary Examiner* — Mohamed Wasel
(74) *Attorney, Agent, or Firm* — Saul Ewing LLP

(57) ABSTRACT

A computer device includes at least one processor in communication with a database storing at least one first object having one or more characteristics and at least one second object having at least one different characteristic to the characteristics of the first object, the at least one processor being configured to control an exchange of the at least one first object or the second object between a first device and a second device, the control comprising the steps of retrieving an identifier associated with the second device, selecting the first object having one or more characteristics or the second object having at least one different characteristic in dependence on the identifier associated with the second device and at least one predetermined rule, and transmit the selected first object or the selected second object to said first device.

21 Claims, 6 Drawing Sheets

(56) References Cited

U.S. PATENT DOCUMENTS

| | | | |
|---|---|---|---|
| 8,221,238 | B1 | 7/2012 | Shaw et al. |
| 2003/0119581 | A1 | 6/2003 | Cannon et al. |
| 2005/0054446 | A1 | 3/2005 | Kammler et al. |
| 2006/0121990 | A1 | 6/2006 | O'Kelley et al. |
| 2006/0135264 | A1 | 6/2006 | Shaw et al. |
| 2008/0153570 | A1 | 6/2008 | Esses et al. |
| 2009/0275412 | A1 | 11/2009 | Green |
| 2010/0125632 | A1 | 5/2010 | Leonard et al. |
| 2010/0216553 | A1 | 8/2010 | Chudley et al. |
| 2010/0227675 | A1 | 9/2010 | Luxton et al. |
| 2011/0218045 | A1 | 9/2011 | Williams et al. |
| 2011/0312409 | A1 | 12/2011 | Vancura |
| 2012/0077580 | A1 | 3/2012 | Mahajan et al. |
| 2012/0184362 | A1 | 7/2012 | Barclay et al. |
| 2012/0184823 | A1 | 7/2012 | Chen et al. |
| 2012/0191606 | A1 | 7/2012 | Milne et al. |
| 2013/0316836 | A1 | 11/2013 | Vogel et al. |
| 2013/0325926 | A1* | 12/2013 | Oozeki .................. G06Q 10/06 709/203 |
| 2014/0113726 | A1* | 4/2014 | Guest .................... A63F 13/358 463/42 |
| 2014/0113727 | A1* | 4/2014 | Guest .................... H04L 67/38 463/42 |
| 2014/0115144 | A1* | 4/2014 | Guest .................... H04L 67/10 709/224 |
| 2015/0321088 | A1* | 11/2015 | Knutsson ............ A63F 13/2145 463/31 |

OTHER PUBLICATIONS

Anonymous, "Bubble Witch Saga—GameSpot", XP055109245, retrieved from the Internet: URL:http://www.gamespot.com/bubble-witch-saga/ [retrieved on Mar. 21, 2014], Jul. 31, 2012, pp. 1-2.

Anonymous, "Daily Bonus Level Oct. 17, 2012: Bubble Witch Saga Fan Site", retrieved from the Internet: URL:http://bubble-witch-saga.se/daily-bonus-level-17-oct-2012/ [retrieved on Mar. 21, 2014] XP 055109244, Oct. 17, 2012, pp. 1-2.

Anonymous, "Facebook Platform—Wikipedia, the free encyclopedia", XP055109249, retrieved from the Internet: URL:http://en.wikipedia.org/w/index.php?title=Facebook_Platform &oldid=533105335 [retrieved on Mar. 21, 2014], Jan. 14, 2013, pp. 1-4.

Anonymous, "Facebook Spiel Candy Crush Saga: Cheats, Tipps, News and Videos BILDspielt", retrieved from the Internet: URL: http://www.bildspielt.de/social-games/3-gewinnt/candy-crush-saga-180643/ [retrieved on Oct. 25, 2013] XP055085339, Apr. 12, 2012, pp. 1-10.

Anonymous, "King.com expands to Google+ with Bubble Witch Saga", XP055109246, retrieved from the Internet: URL:http://www.insidesocialgames.com/2012/01/24/king-com-expands-tog--goe-withbubble-witch-saga/ [retrieved on Mar. 21, 2014], Jan. 24, 2012, pp. 1-12.

Anonymous, "King.com Skill Games for iPhone and Facebook: http://www.ubergizmo.com/2009/07/king-com-skill-games-for-iphone-and-facebook/", XP055085351, retrieved form the Internet: URL: http://www.googl.e.de/imgres?client=firefox-a&hs=0gJ &sa=X&rls=org.mozilla:en-GB:official&biw=1680&bih=858 &tbm=isch&tbnid=Dp0hnHVKMxtoUM:&imgrefurl=http://www.ubergizmo.com/2009/07/king-com-skill-games-for-ip, Jul. 13, 2009, pp. 1-2.

Anonymous, "Why King.com's Candy Crush ios crushing it on Facebook", retrieved from the Internet: URL: http://blog.games.com/2012/05/01/why-king-coms-candy-crush-is-crushing-it-on-facebook, [retrieved on Oct. 25, 2013] XP055085338, May 1, 2012, pp. 1-4.

Collins, "Will Collins Game Spotlight: Candy Crush Saga", retrieved from the Internet: URL: https??developers.facebook.com/blog/post/2012/06/15/game-spotlight-candy-crush-saga/ [retrieved on Oct. 25, 2013] XP055085345, Jun. 15, 2012, pp. 1-2.

* cited by examiner

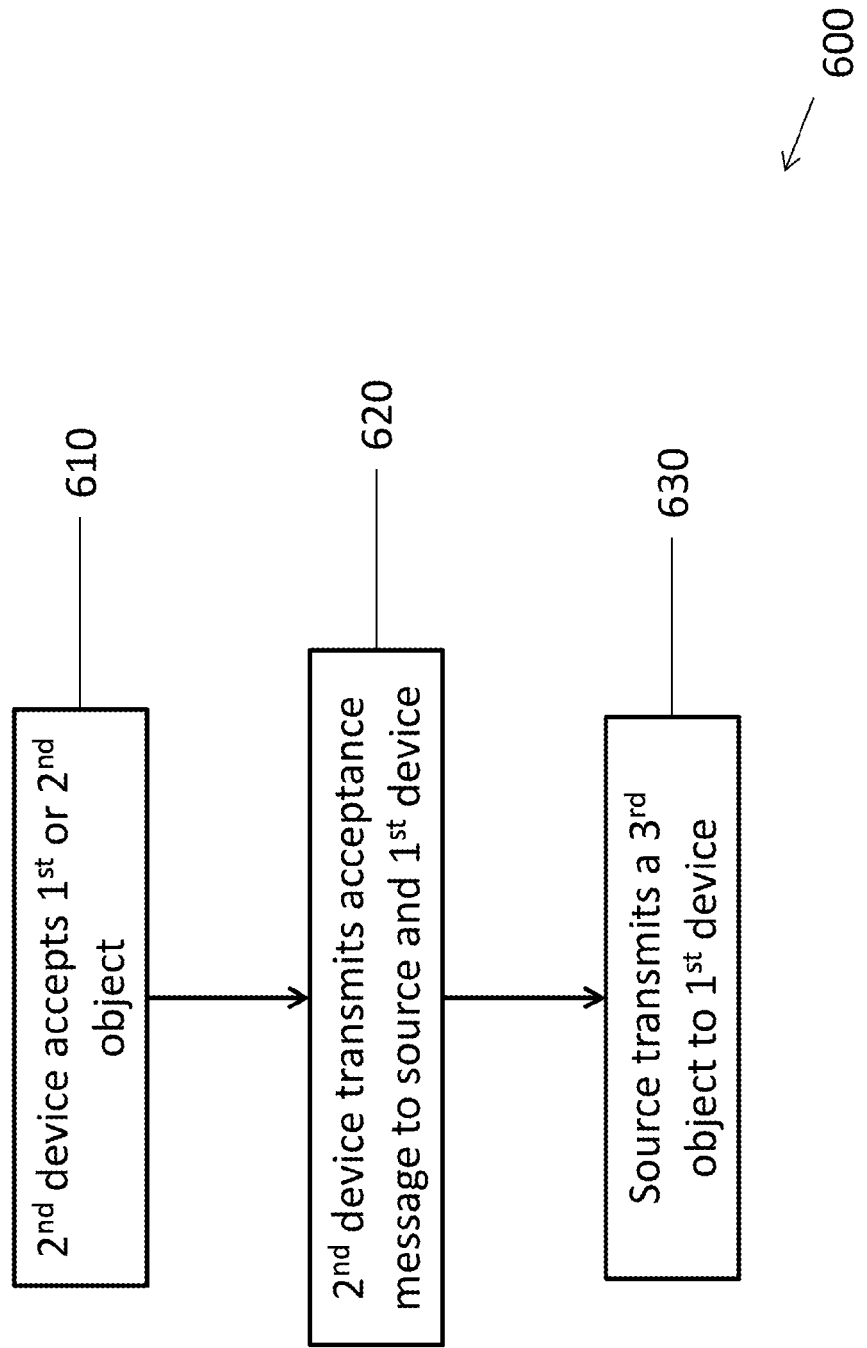

COMPUTER DEVICE, SYSTEM AND METHODS FOR CONTROLLING AN EXCHANGE OF OBJECTS BETWEEN DEVICES

CROSS-REFERENCE TO RELATED APPLICATIONS

This application is based on, and claims priority to, U.S. Provisional Application No. 61/811,019, filed Apr. 11, 2013, the entire contents of which being fully incorporated herein by reference.

FIELD OF EMBODIMENTS

Some embodiments relate to computer devices connected in a communications network wherein the computer devices are configured to selectively communicate with each other over the network.

BACKGROUND

One context where computer devices need to selectively communicate is in computer implemented so called "social" or "casual" gaming. Such games are popular, particularly when played against or with other players or users, either with direct local based wired or wireless connections between the computing devices of each player, or via a combination of such connections through a local or wide area network such as the internet.

Such computer implemented gaming may have a very large number of players, each having associated data such as identity (user-name), email, scores, time played, and other associated data which may be provided by the user, for example via social network accounts and associated friends therein.

Several problems may exist in engaging such users in communication via such a wide area network. For example, ensuring that only trusted devices belonging to a user associated with another user (i.e. a "friend") are the recipients of messages can be challenging technically whilst preserving and respecting the user's privacy and permissions.

SUMMARY OF DISCLOSURE

The inventors have recognised that such communication may use up unnecessary bandwidth of the network, and that ensuring that a targeted player or user to user transaction based on the user preferences may save bandwidth and improve trust in the network controller or provider.

According to a first aspect, there is provided a computer implemented method comprising at least one processor in communication with a database storing at least one first object having one or more characteristics and at least one second object having at least one different characteristic to the characteristics of said first object, the at least one processor being configured to control an exchange of the at least one first object or said second object between a first device and a second device, the control comprising the steps of retrieving an identifier associated with the second device, selecting the first object having one or more characteristics or the second object having at least one different characteristic in dependence on at least one of said identifier associated with the second device and at least one predetermined rule, and transmit said selected first object or said selected second object to said first device.

According to a second aspect, there is provided a device comprising at least one processor in communication with a database storing at least one first object having one or more characteristics and at least one second object having at least one different characteristic to the characteristics of said first object, the at least one processor having a communication link with a first device and a second device, the at least one processor being configured to retrieve from a first database connected to said first device an identifier associated with the second device, to select the first object having one or more characteristics or the second object having at least one different characteristic in dependence on at least one of said retrieved identifier associated with the second device and at least one predetermined rule stored in the database, and to transmit said selected first object or said selected second object to said first device via said identifier and said communication link.

In an embodiment of the first and or second aspect the at least one predetermined rule may comprise the at least one processor transmitting said second object to said first device based on a count of one or more object characteristics associated with or stored by said second device matching or exceeding the one or more characteristics of said first object.

In an embodiment, the at least one predetermined rule may comprise the at least one processor transmitting said first object to said first device based on a count of one or more object characteristics associated or stored by said second device being less than a count of the one or more characteristics of said first object stored by said second device.

In an embodiment, the first device may be configured to transmit said received determined first or second object to said second device.

In another embodiment, the control of said exchange may comprise transmitting a third object having one or more characteristics to said first device subsequent to the transmittal of said first or second object to said second device.

In yet another embodiment, the at least one processor may be further configured to monitor said first device and transmit said first or second object to said first device in dependence on monitoring criteria.

The monitoring criteria may comprise data regarding a game state, and may comprise for example the time spent playing the game, the level or achievement or score in the game, or the number of lives in said game.

The monitoring criteria may comprise at least one of the number of sessions initiated by the first device, the time since first device initiated a session.

In an embodiment, a third object may be transmitted to said first device upon the receiving of said first or second object by said second device.

The first, second and third object may comprise an in game asset, such as an "extra life", extra time, or a score bonus or multiplier, or a "booster" for example.

In some embodiments, the one or more object characteristic may comprise attributes defining a displayed colour, and/or object type.

For example, the object type may comprise an "extra life", or a "booster", or an in-game currency amount, a seeding level of real world currency such as dollars, euros or pounds, or a level bonus.

In an embodiment wherein the first or second device receives a first object in the form of real world currency, further options may comprise the user of said first or second device converting or transforming said first object to a second object such as an invitation to the computer implemented game, or an in game asset, such as an "extra life", extra time, or a score bonus or multiplier, or a "booster" for example.

In yet a further embodiment the control device may provide a message to a user of the first device to prompt said user to share or exchange a first or second object.

The message may be triggered by for example determining or retrieving the number of unique identifiers associated with the first or second device and triggering a message to a user of the first or second device in dependence on the number of unique identifiers determined or received.

In the above embodiment, said message may comprise an invitation.

According to yet another aspect, there is provided a computer readable storage device storing instructions that, when executed by at least one processor, causes said at least one processor to perform the following steps, retrieving an identifier associated with a second device, selecting a first object having one or more characteristics or a second object having at least one different characteristic in dependence on said identifier associated with the second device and at least one predetermined rule, and transmit said selected first object or said selected second object to said first device.

According to another aspect, there is provided a computer program comprising instructions that, when executed by at least one processor, causes said processor to perform the following steps, retrieving an identifier associated with a second device, selecting a first object having one or more characteristics or a second object having at least one different characteristic in dependence on said identifier associated with the second device and at least one predetermined rule, and transmit said selected first object or said selected second object to said first device.

A user device comprising at least one processor in communication with a first database or storage storing at least one first object having one or more characteristics and at least one second object having at least one different characteristic to the characteristics of said first object, the device comprising at least one processor having a communication link with a control device, the at least one processor being configured to receive from a database connected to said control device an identifier associated with a second device, to receive the first object having one or more characteristics or the second object having at least one different characteristic in dependence on at least one of said retrieved identifier associated with the second device and at least one predetermined rule stored in the database.

In an embodiment the user device is further configured to transmit said received first object or said received second object to said second device via said identifier and said communication link.

The first and second device may comprise user devices.

In yet another aspect there is provided processing means in communication with database or memory means via communication means, the database or memory means storing at least one first object having one or more characteristics and at least one second object having at least one different characteristic to the characteristics of said first object, the processing means having a communication link provided by link means with first device means and second device means, the processing means being configured to retrieve from a first database or memory means connected to said first device means an identifier associated with the second device means, to select the first object having one or more characteristics or the second object having at least one different characteristic in dependence on said retrieved identifier associated with the second device means and at least one predetermined rule stored in the database or memory means, and to transmit said selected first object or said selected second object to said first device means via said retrieved identifier and said link means.

In another aspect there is provided a computer implemented method of controlling a user interface responsive to user engagement with a displayed game area on the interface, the method comprising the following implemented by at least one processor of a device displaying a game area having a plurality of first game objects on said display, providing one or more characteristics of said first game objects and one or more action characteristics of at least one second game object, selecting the at least one second game object and associated characteristics for display, displaying said at least one second game object at a position on said game area, detecting user input re-arranging one or more of said first game objects, and activating said action characteristics of the at least one second game object in dependence on said detected input re-arranging said one or more first game objects to a position on said game area associated with a displayed second object position, and wherein at least one of the action characteristics of the second game object comprises removing the first object from said game area or rendering said first object immovable with respect to the second object.

In an embodiment of this aspect, the at least one action characteristic of said second game object comprises linking first object and said second object so that the first object no longer responds to touch input.

In another embodiment of the aspect, the at least one action characteristic of said second game object comprises removing the first object and said second object so that the first object no longer responds to touch input. For example the first object characteristics may comprise a graphical depiction of an animal, and the second object characteristics may comprise a graphical depiction of an "animal trap".

Activation of the trap via the stored at least one action characteristic may occur in response to touch input, or a sequence of said touch input.

In yet another aspect, there is provided a computer implemented method of controlling a user interface responsive to user engagement with a displayed game board on said interface, the method comprising the following implemented by at least one processor of a computer device in communication with said interface and at least one memory displaying a game board having a plurality of game objects, each game object having one or more characteristics, on said display, detecting a selection of at least one game object with respect to said displayed game board in response to user input, re-ordering said selected game objects on said displayed game board with respect to said input, creating a further game object sharing at least one of the one or more characteristics of said re-ordered game object in dependence on a count of a number of the game objects and pre-existing further game objects.

In an embodiment of this aspect, the game objects may have characteristics indicating that they are upgradeable to a further game object. The further game object may, in some embodiments comprise a characteristic that removes a plurality of game objects when activated by touch input or upon a match-3 condition (i.e. the user input rearranges at least three game objects sharing at least one same characteristic into adjacent positions on the game board).

The number of further game objects and/or their proximity to each other with respect to their positions on the game board may lead to a chain reaction of their respective action characteristics when one further game object is activated.

This may lead to completion of the game board or target in a disengaging and unfulfilling manner.

Therefore, the inventors have realised that a threshold applied to for example a count of the number of game and further game objects may advantageously avoid such disengagement.

BRIEF DESCRIPTION OF DRAWINGS

To understand some embodiments, reference will now be made by way of example only to the accompanying drawings, in which:

FIG. 6 is a flowchart of yet another method embodiment.

DETAILED DESCRIPTION OF SOME EMBODIMENTS

The terms user and player are used interchangeably throughout this document and no specific meaning is intended using one or the other unless the context suggests otherwise.

Incentivising members of a network to invite others to the network or product of the network presents many challenges, particularly in the field of casual or social gaming where user habits and schedules render the demographics and user behaviour of such a network at best unpredictable and perhaps chaotic.

The inventors have realised such, and more particularly have recognised a problem in that attempting to incentivise technical transactions in a network without permission may use up unnecessary bandwidth of the network and may engender mistrust of the network controller or company providing the service.

Such networks and systems typically may comprise servers or computers and user device(s). A first user device and a second user device may be in the form of a mobile telephone, laptop, personal computer or laptop, or may comprise augmented reality or virtual reality equipped devices, such as the Oculus Rift™ headset or GoogleGlass™, for example.

Figure 1:
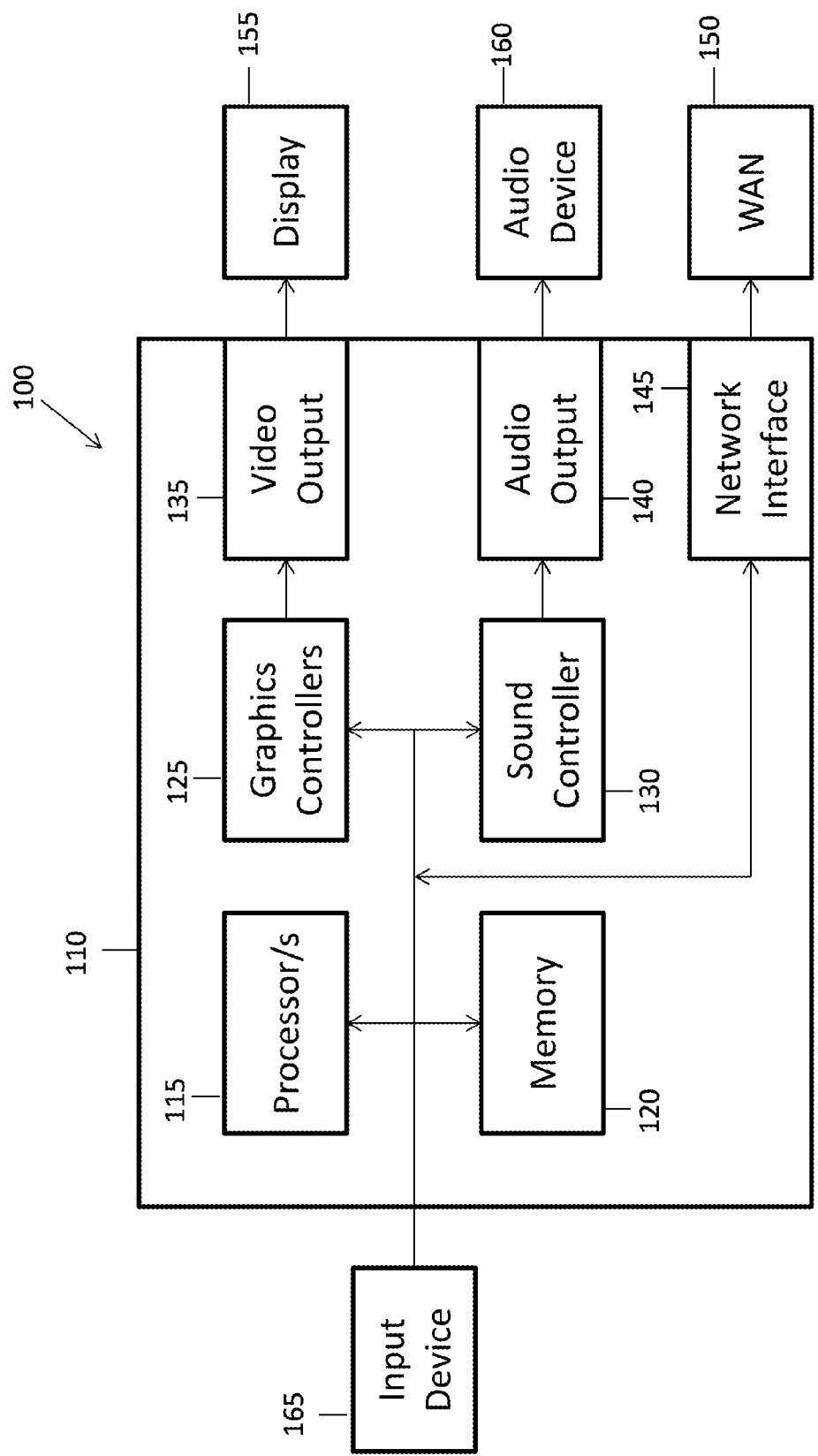
FIG. 1 shows an example computing device of an embodiment.

Such a first or second device 100 according to an embodiment is shown in FIG. 1. All of the blocks shown may be implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The first or second user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
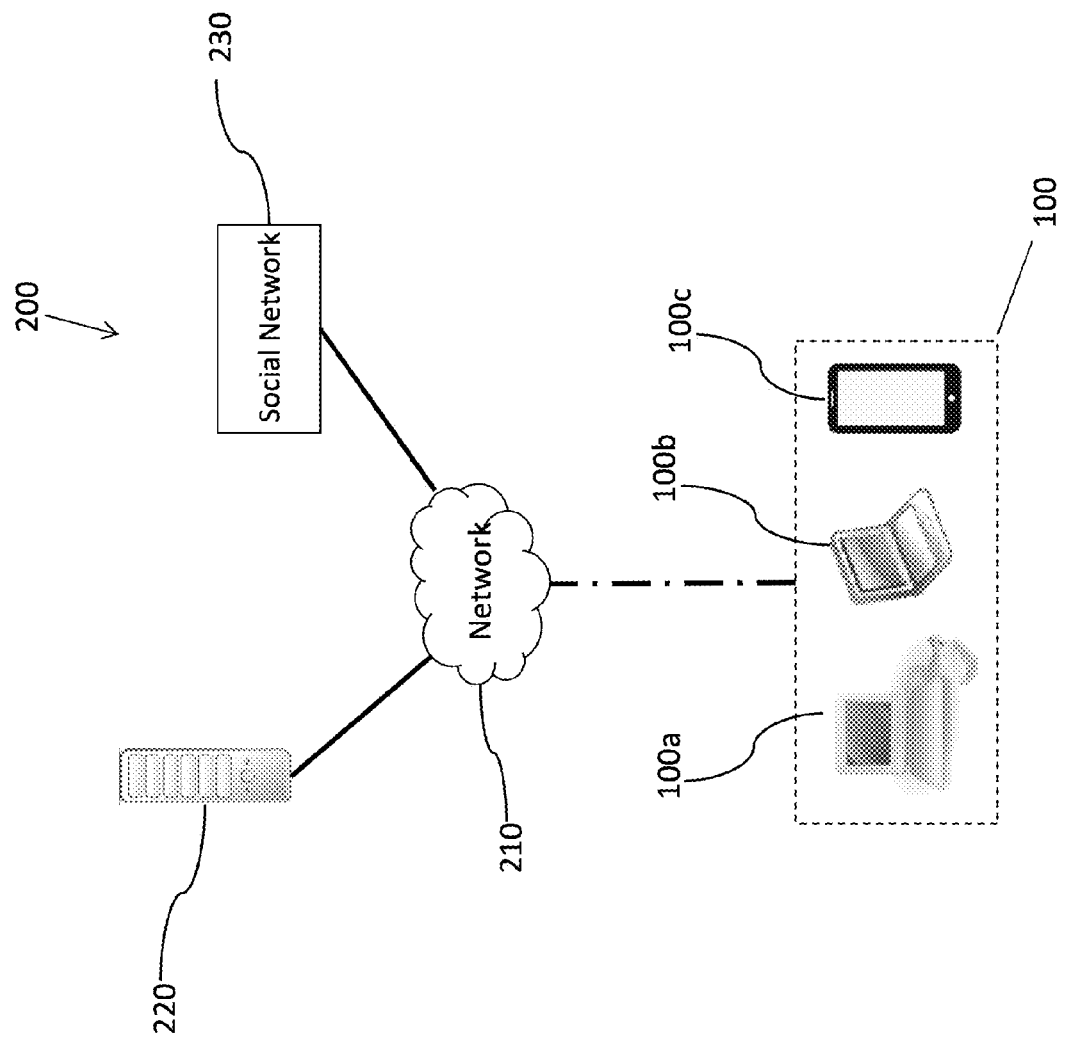
FIG. 2 illustrates an example system in which some embodiments may be provided.

FIG. 2 schematically shows a typical system 200 in some embodiments. The system 200 comprises a server 220 which may store databases of game player's details, profiles, statistics, etc. In practice, one or more databases may be provided. Where more than one server is provided, the database(s) may be provided in one database or across two or more servers. The server 220 may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230 such as Facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server 220. Data streams or updates may be supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet. Other local or wide area networks and methodologies may apply.

Figure 3:
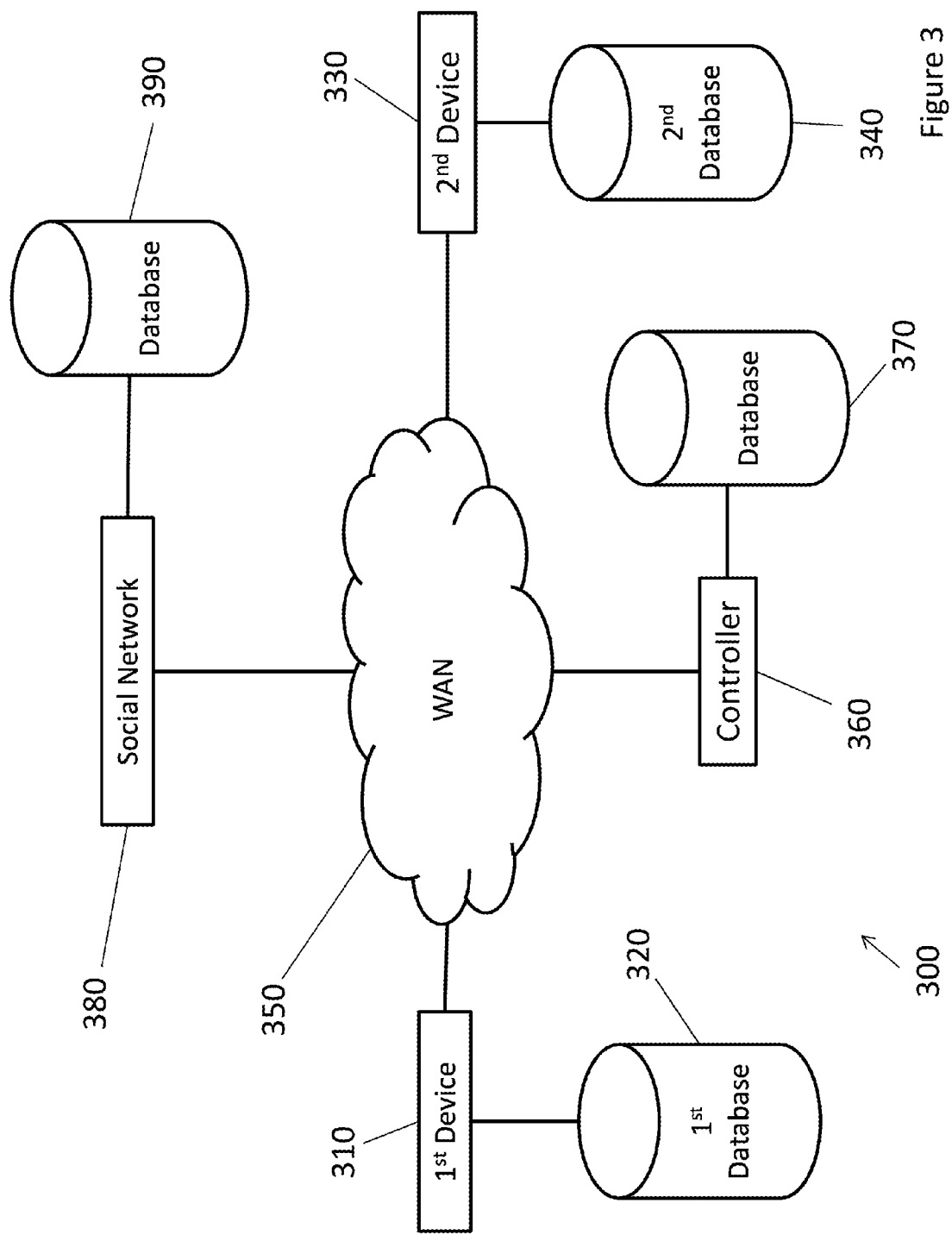
FIG. 3 illustrates the example system of FIG. 2 in more detail.

FIG. 3 shows in more detail some elements of embodiments of the system of FIG. 2. FIG. 3 shows a system 300 comprising a first computing device 310 connected to a first database 320. The first device 310 is connected via a wide area network 350 to a second device 330, the second device 330 being in communication with and connected to a second database 340. The network 350 also provides connections to a controller device 360, the controller device 360 being in communication with a controller database 370. The network 350 may also provide communication or links to social networks 380 for example, and associated databases 390 of the social networks.

The controller 360 comprises at least one processor in communication with the database 370 and may have access to the databases to the first database 320 of the first device 310 and/or the second database 340 connected to the second device 330. It should be recognised by those skilled in the art that the database 320, 340, 370, 309 as used here may comprise external or remote storage, such as that described as being in the "cloud". Alternatively, the data may be stored or copied into or additionally, maybe you local memory of the first 310, second device 330 or the controller device 360. Optionally, access is provided to said controller 360 via the wide area network 350 to the first device 310 and the second device 330 and their respective storage or databases 320, 340, 390. Although not shown in the diagram, the access the controller 360 has to the first device 310 and/or second device 330 may also be via the social network 380 depending on the user preferences and security settings of the first device 310 and the user of the second device 330.

Figure 4:
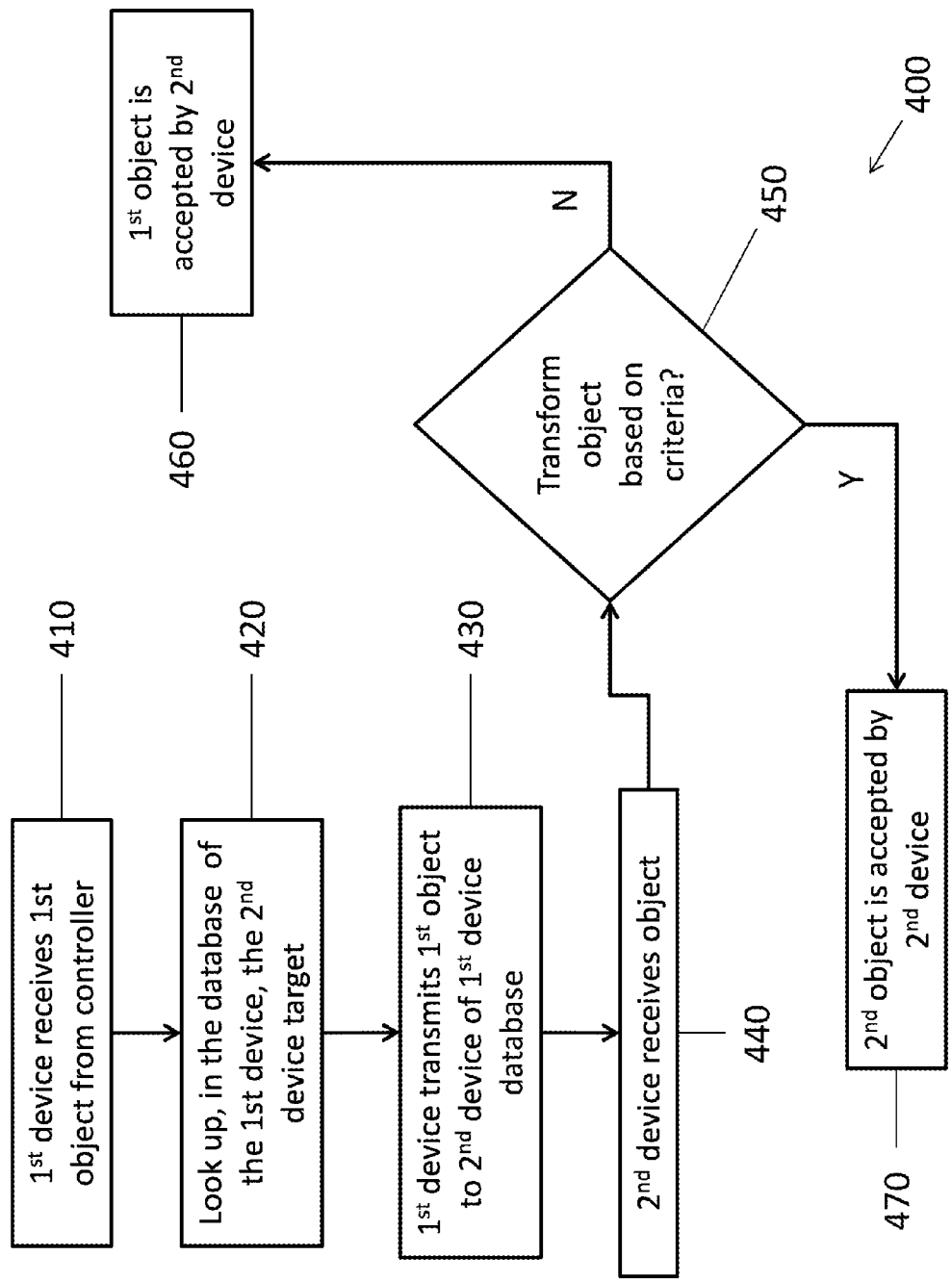
FIG. 4 illustrates a flowchart of a method according to an embodiment.

An embodiment describing the interaction of the various elements of FIG. 3 will now be described with reference to FIGS. 4 and 5. FIG. 4 shows a flowchart describing steps taken by the control device 360 and, or first device 310 and second device 330. At step 410 the first device 310 receives a first object from the control device 360. The object may be a game related objects or asset, having one or more characteristics. The characteristics may comprise an object type, colour, and value of for example in game currency, or achievement level. Other characteristics may be provided based on the game designers ingenuity and imagination.

For example, in an embodiment the first object 410 provided from the controller 360 to first device 310 may comprise a "gift" in the form of an extra "life" for a computer implemented game provided by controller 360. The first device 310 has a database 320 storing for example user or computer identities and identifiers. For example, the first database 320 may comprise a so-called "friends list" of the user of the first device 310, the friends list stored in said first database 320 being available via the social networks 380 to a user of a second device 330 within the list. The control 360 may have access to the "friends list" stored on said first database 320 of said first device 310, depending on the first device 310 user preferences and privacy settings.

After receiving the first object from the controller 360 the first device 310 or controller 360 at step 420 looks up in database 320 the second device 330 target identifier. The identifier of the second device 330 may comprise an e-mail address in the "friends list" of the first device 310, or made comprise a unique identifier identifying the device associated with the second user. After looking up the identifier, the first device 310, at step 430 transmits the first object received from and said controller 360 to the second device 330. At step 440 the second device 330 receives the object, and stores that objects in its associated second database 340. Upon the receipt of the object by the second device 330, the controller 360 may in some embodiments interrogate the second device 330 objects, and based on certain criteria, transform the first object received to a second different object or asset as shown at step 450 and step 470 of FIG. 4.

For example, in one embodiment the first object may comprise a gift to the user of the second device 330 in the form of an extra life for a game that both the user of the first device 310 and the user of the second device 330 play in the network 350, 380.

The gift provided from the first device 310 to the second device 330 in the form of the first object may comprise the characteristic of being an extra life amongst other characteristics.

However, should the player of the second device 330 have for instance, a full set of lives available to him for the game, then the controller may transform the first object to a second object based on the fact that the first object, being an extra life, exceeds a count.

That is, for example in an embodiment the second player may have a full quota of "lives", and therefore a gift in the form of an extra life would not be appropriate. In such a situation the first object is converted or transformed via step 450 to a second object, having a different characteristic to the first object. For example, in one embodiment the extra life may be converted to an in game currency representation, or "coins", or a special game object or asset such as a booster that can be used in the game. Boosters may comprise a "line-blast" effect, or an "extra time" effect, or a "bomb" effect for example to aid the user of the second device 330 in completing a level of, or the game itself.

Should the criteria dictate that the object is not transformed, and the controller 336 follow subsequently executes step 460 wherein the original first object offered by controller 360 to first device 310 and subsequently offered by the first device 310 to the second device 330 is not transformed and is accepted by the second device 330.

Hence, a method in which an automatically generated "gift" is offered through a network of friends, the gift transforming based in part on the status or criteria of the friends current game state.

Figure 5:
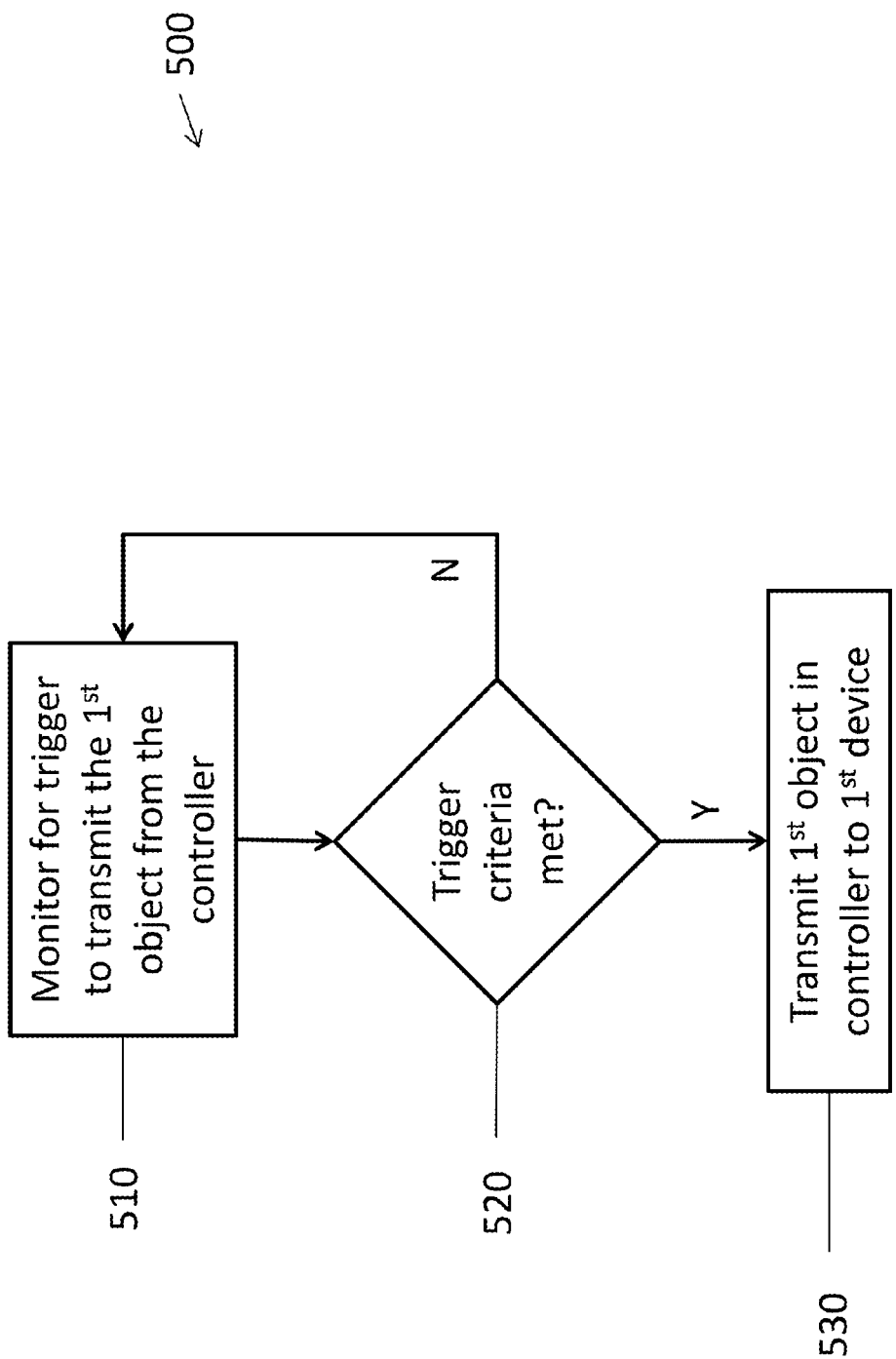
FIG. 5 depicts a flowchart of a method embodiment.

FIG. 5 illustrates a flowchart encompassing or describing steps regarding the triggering of the provision of the first object or asset to the first device 310. At step 510, controller 360 monitors the network for a trigger to instantiate and transmit a first object to the first device 310.

The trigger criteria, if met at step 520, results in the controller 360 transmitting the first object, after generation or instantiation, to the first device 310 at step 530. If the controller criteria is not met, the process loops back from step 520 to step 510 and the controller continues monitoring 510.

In an embodiment, the trigger criteria may comprise the number of friends or second device 330 identifiers that the user of the first device 310 is in contact with.

In another embodiment, the trigger criteria may comprise the length of time that the first device 310 has spent in the game. For example, the user of the first device 310, may be rewarded by being proffered the first object from the controller 360 since the user has spent a certain amount of time or effort as monitored by the controller 360 in the game.

In other embodiments, the criteria may comprised the level of achievement that the user of the first device 310 has attained in the game, high score, or other such common gaming criteria.

It is important to note, that in these embodiments, it is the offering of a first object or asset for the user of the first device 310 by the controller 360, said gift or asset being subsequently offered by the user to a second device 330 associated with or connected with the user of the first device 310 (e.g. a "friend") that enables a type of viral marketing, in line with the permissions and privacy concerns of the users of the first device 310 and second device 330 and their respective friend lists or circles.

A reward scheme is shown in FIG. 6 wherein upon receipt of the first object or a second object by the second device 330 at step 610, the second device 330 may then transmit at step 620 an acceptance message to the controller 360 and/or the first device 310. Subsequently the controller 360, on receiving the acceptance from the second device 330 may transmit a third object to the first device 310 at step 630. For example, the provision of a gift to the user of the first device 310, and the subsequent forwarding of that gift by the user of the first device 310 to a user of the second device 330 in that first device user's circle of friends, provides a reward to the user of the first device 310 in having forwarded the first or second object and its subsequent acceptance. The third object may be in the form of in game currency, lives, achievement, boosters, or actual currency.

Therefore in these embodiments, a user is rewarded for forwarding gifts or help provided by the controller 360 to his or her friends 330, thereby providing socially acceptable sharing according to a user's preferences and privacy.

A person skilled in the art will realise that different approaches to implementing the method, device and computer program steps are not exhaustive, and what is described herein are merely certain preferred embodiments. It is possible to implement embodiments in a number of variations without departing from the spirit or scope of the invention.

The invention claimed is:

1. A computer implemented method of controlling a game, implemented by at least one processor in communication with a database storing multiple objects having one or more different characteristics, the at least one processor being configured to:
   determine that at a first user device, a first computer game object has been selected for a computer implemented game on a second user device,
   retrieve from the database, using the at least one processor, game information associated with the computer implemented game on the second device,
   determine if said first computer game object or a second computer game object is to be provided in said computer implemented game on said second device in dependence on at least one of said game information associated with the second device and at least one predetermined rule, and
   transmit information relating to said first computer game object or said second computer game object, in dependence on said determining step, to said second device.

2. The method according to claim 1, wherein the at least one predetermined rule comprises the at least one processor selecting and transmitting said second object to said first device based on a count of one or more object characteristics associated with or stored by said second device matching or exceeding the one or more characteristics of said first object.

3. The method according to claim 1, wherein the at least one predetermined rule comprises the at least one processor transmitting said first object to said first device based on a count of one or more object characteristics associated or stored by said second device being less than a count of the one or more characteristics of said first object.

4. The method according to claim 2, wherein the first device is configured to receive said second object and transmit said received second object to said second device.

5. The method according to claim 3, wherein the first device is configured to receive said first object and transmit said received first object to said second device.

6. The method according to claim 1, wherein the control of said exchange comprises transmitting a third object having one or more characteristics to said first device subsequent to the transmittal of said first or second object to said second device.

7. The method according to claim 1, wherein the at least one processor being configured to control an exchange of the at least one first object or said second object between a first device and a second device, is further configured to monitor said first device and transmit said first or second object to said first device in dependence on monitoring criteria.

8. The method according to claim 7, wherein the monitoring criteria comprises at least one of: number of sessions initiated by the first device, time since first device initiated a session, a score or level achievement of said first device.

9. The method according to claim 4, wherein a third object is transmitted to said first device upon the receiving of said second object by said second device.

10. The method according to claim 5, wherein a third object is transmitted to said first device upon the receiving of said first object by said second device.

11. The method according to claim 1, wherein the first, second and third object comprise in-game assets of a computer implemented game.

12. A device for controlling a game, implemented by at least one processor in communication with a database storing multiple objects having one or more different characteristics, the at least one processor having a communication link with a first device and a second device, the at least one processor being configured to:
   determine that at a first user device, a first computer game object has been selected for a computer implemented game on a second user device,
   retrieve from a first database, using the at least one processor, game information associated with the computer implemented game on the second device,
   determine if said first computer game object or a second computer game object is to be provided in said computer implemented game on said second device in dependence on at least one of said game information associated with the second device and at least one predetermined rule, and
   transmit information relating to said first computer game object or said second computer game object, in dependence on said determining step to said second device.

13. The device according to claim 12, wherein the database stores at least one predetermined rule.

14. The device according to claim 13, wherein said predetermined rule comprises said control processor transmitting said second object to said first device based on a count of one or more object characteristics associated with or stored by said second device matching or exceeding the one or more characteristics of said selected first object.

15. The device according to claim 13, wherein the at least one predetermined rule comprises said control processor transmitting said first object to said first device based on a count of one or more object characteristics associated or stored by said second device being less than a count of the one or more characteristics of said first object stored by said second device.

16. The device according to claim 12, wherein the one or more object characteristics comprise attributes defining a displayed colour.

17. The device according to claim 12, wherein the one or more object characteristics comprise object type.

18. A non-transitory computer readable storage device storing instructions that, when executed by at least one processor, causes said at least one processor to perform the following steps:

determining that at a first user device, a first computer game object has been selected for a computer implemented game on a second user device, retrieving from a database, using the at least one processor, game information associated with the computer implemented game on the second device, determining if said first computer game object or a second computer game object is to be provided in said computer implemented game on said second device in dependence on at least one of said game information associated with the second device and at least one predetermined rule, and transmit information relating to said first computer game object or said second computer game object, in dependent on said determining step, to said second device.

19. The computer readable storage device storing instructions according to claim 18, that, when executed by at least one processor, causes said at least one processor to further perform the steps of claim 2.

20. The computer readable storage device storing instructions according to claim 18, that, when executed by at least one processor, causes said at least one processor to further perform the steps of claim 3.

21. A user device comprising at least one processor in communication with a first database or storage storing multiple objects having one or more different characteristics, the device comprising at least one processor having a communication link with a control device, the at least one processor being configured to:

determine that at a first user device, a first computer game object has been selected for a computer implemented game on a second user device, retrieve from the database, using the at least one processor connected to said control device, game information associated with the computer implemented game on the second device, determine if said first computer game object or a second computer game object is to be provided in said computer implemented game on said second device in dependence on at least one of said game information associated with the second device and at least one predetermined rule, and transmit information related to said first computer game object or said second computer game object, in dependent on said determining step, to said second device.

\* \* \* \* \*